Patented Aug. 20, 1940

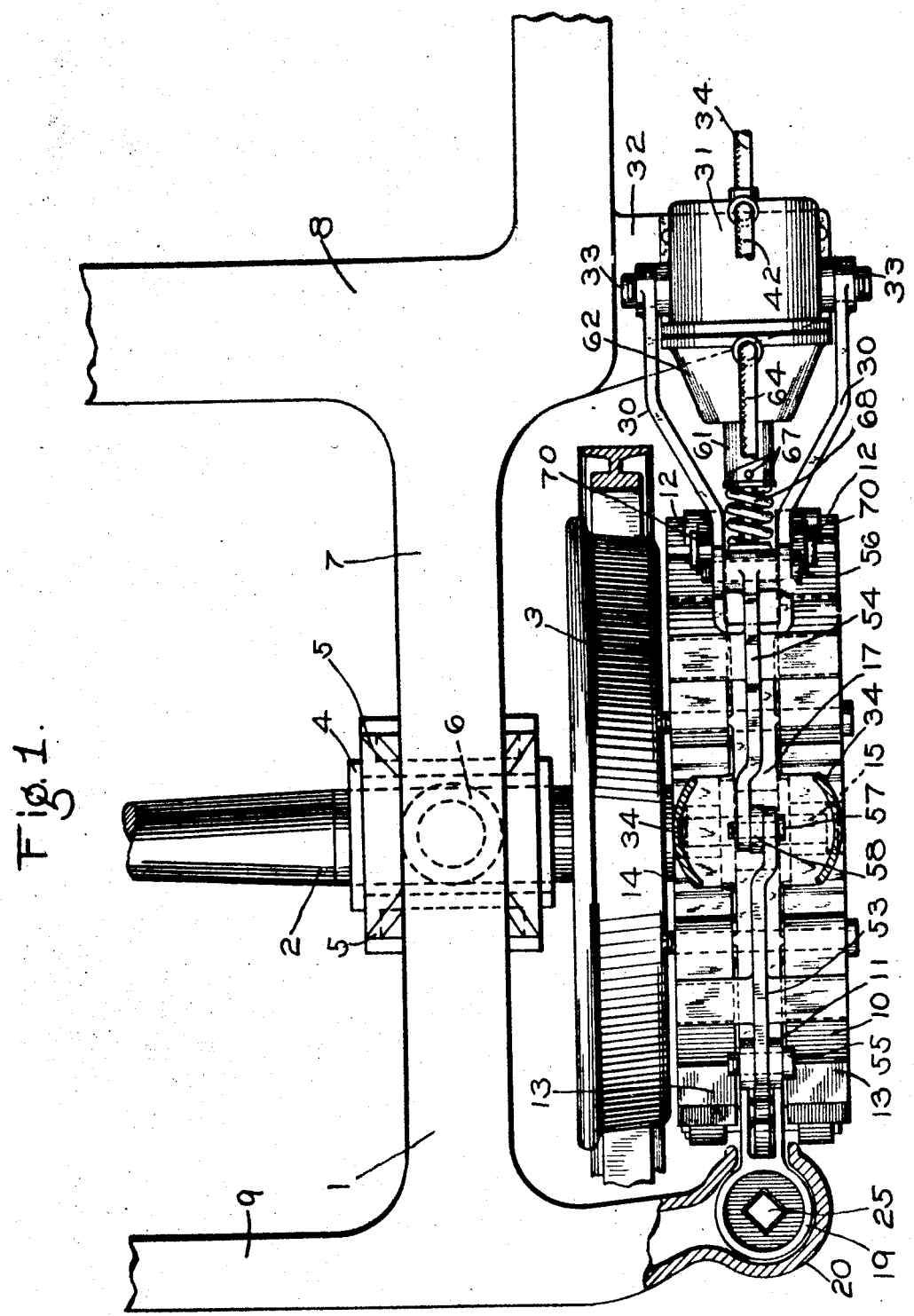

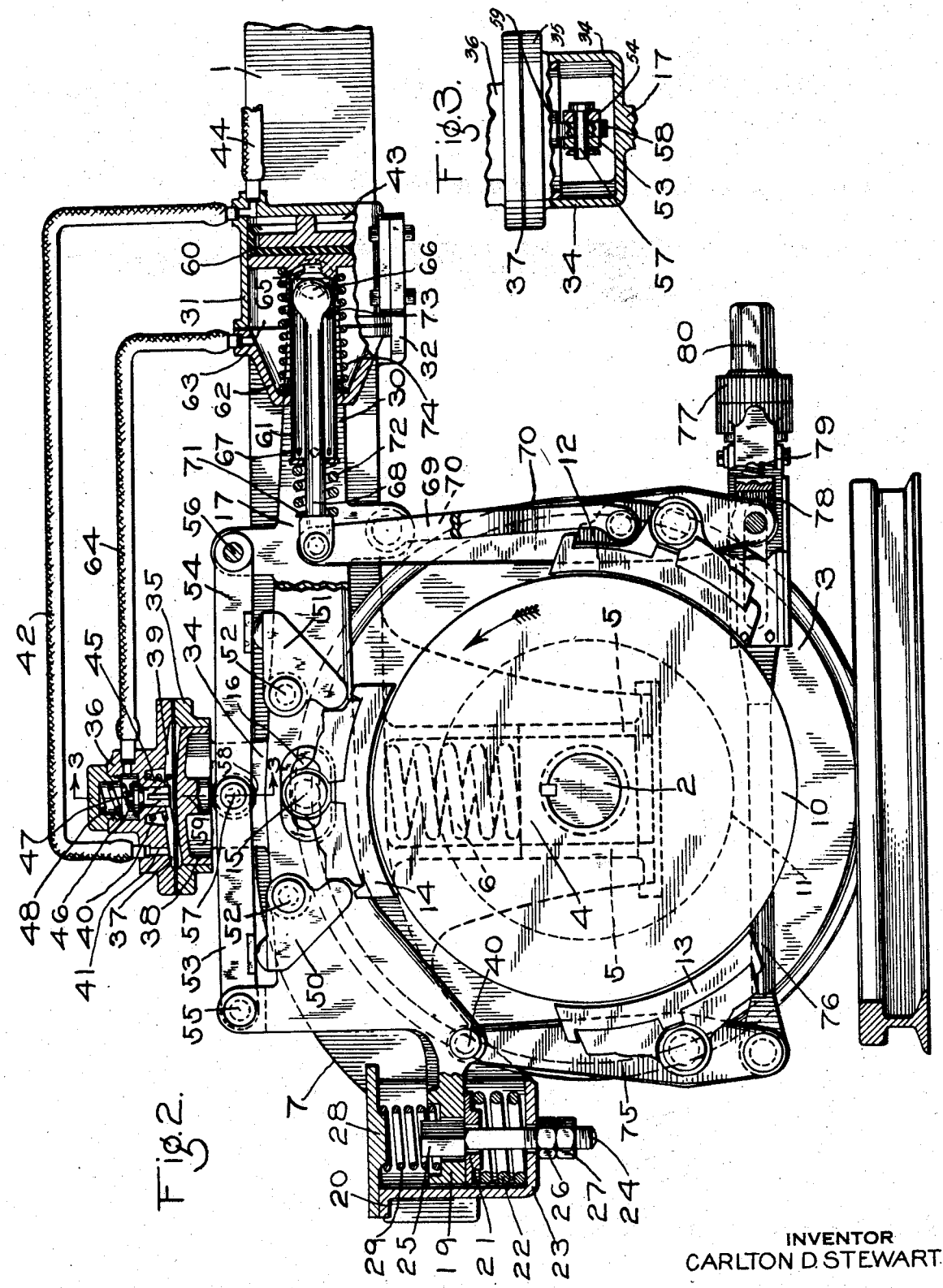

2,212,409

UNITED STATES PATENT OFFICE 2,212,409

BRAKE MECHANISM

Carlton D. Stewart, Wilkinsburg, Pa., assignor to The Westinghouse Air Brake Company, Wilmerding, Pa., a corporation of Pennsylvania Application June 29, 1939, Serial No. 281,839

25 Claims. (Cl. 188—181)

This invention relates to railway vehicle truck brakes and more particularly to that type of brake shown and described in my prior filed application for United States Letters Patent, Serial No. 280,923, filed June 24, 1939, in which, in effecting an application of the brakes, downwardly directed forces set up in the mechanism upon the frictional braking engagement of the two clasp arranged brake elements or shoes with a wheel and axle assembly of the truck will be transmitted through the medium of another brake element or shoe to the assembly instead of to the truck frame, and in which is included automatically operative control means responsive to torque exerted on the clasp arranged brake elements during braking for controlling the force with which the elements are pressed into braking engagement with an individual wheel and axle assembly so as to regulate the braking effect of all three brake elements according to any one of various different values which the operator may select through the operation of the brake valve device or any other desired control apparatus. This control of the braking effect will prevent unwanted locking of the vehicle wheels and the consequent sliding thereof under normal conditions of adhesion between the wheels and the track rails.

The principal object of the invention is to provide a novel brake mechanism of the above mentioned type in which the brake element which is actuated into braking engagement with the wheel and axle assembly by the clasp arranged brake elements when an application of the brakes is effected, is responsive to the torque exerted thereon by the wheel and axle assembly to actuate the brake control means so as to regulate the braking effect on the assembly according to any one of various different braking values which the operator may select through the operation of the usual brake valve device or other control mechanism.

Another object of the invention is to provide a brake mechanism of the above mentioned type with a single torque responsive control mechanism for controlling the braking effect of the braking elements or shoes on the wheel and axle assembly, which control mechanism, when the wheel and axle assembly is braked while rotating in one direction, will respond to a certain torque and which, when the assembly is rotating in the opposite direction, will respond to a torque of lesser magnitude.

In the aforementioned pending application, the torque responsive control mechanism is rigidly carried with the truck frame and includes means which serve as a floating pivotal support for the inner end of the brake carrier which carries the clasp arranged brake elements as well as the third brake element, said inner end of the carrier being bodily movable either upwardly or downwardly, depending upon the direction of rotation of the wheel and axle assembly in response to torque, for effecting the operation of the control means. In some instances it may not be desirable or advantageous to have this end of the carrier moved bodily and with this in mind it is another feature of the invention to mount the control mechanism on the carrier and to control its operation by the action of the third brake shoe or shoes in response to the torque thereon, thereby eliminating the necessity for the floating pivotal connection between the carrier and the truck frame and making it possible to provide the truck frame with a rigid pivot for the carrier.

A further object of the invention is to provide a novel brake mechanism of the above mentioned type in which the brake element which is actuated by the clasp arranged brake elements is movably mounted on the brake carrier and which is responsive to the torque of the assembly when an application of the brakes is being effected for actuating a novel control apparatus to control the braking effect on the assembly.

Other objects and advantages will appear in the following more detailed description of the invention.

In the accompanying drawings, Fig. 1 is a plan view of a portion of a railway vehicle truck and brake rigging embodying the invention, portions of the apparatus being removed to more clearly illustrate the invention; and Fig. 2 is a side elevational view of the same, portions of the truck frame and brake mechanism being shown in section; and Fig. 3 is a fragmentary vertical sectional view through the brake carrier and control mechanism and taken on the line 3—3 of Fig. 2.

For illustrative purposes the invention is shown embodied in a four wheel railway vehicle truck of the type having a cast metal truck frame 1 and the usual longitudinally spaced wheel and axle assemblies each of which assemblies may comprise an axle 2 and laterally spaced wheels 3 which may be secured in any desired manner to the axle for rotation therewith.

Between the wheels and at each side of the truck the axle of each wheel and axle assembly is suitably journaled in axle boxes 4 which are loosely mounted between spaced downwardly depending pedestal jaws 5 preferably formed integral with the truck frame. The truck frame is resiliently supported from each end of each wheel and axle assembly by a spring 6 for vertical movement relative to the assembly, the spring in the present embodiment of the invention being seated on the adjacent axle box 4.

The truck frame differs somewhat from the conventional type of frame in that each side member 7 thereof is inset or recessed opposite each wheel to accommodate the wheel, and in that the pedestal jaws between which the axle boxes 4 are mounted, are disposed inboard of the wheel. The side members of the frame may be integrally connected together in the usual manner by transversely extending transoms 8 and transversely extending end pieces 9.

It will here be understood that each wheel and axle assembly may be provided with two of the brake mechanisms hereinafter fully described and that both of these mechanisms may be substantially identical with each other in construction and arrangement and may operate independently of each other and will have substantially the same operating characteristics. In view of this only one such brake mechanism, one end of a wheel and axle assembly and the necessary portions of the truck frame have been shown in the drawings and, for the sake of simplicity and clearness, the following description will be more or less limited to what is shown.

Located outboard of the wheel 3 but adjacent thereto is a brake drum 10 which is secured in any desired manner to the outer end of the axle 2 for rotation therewith. This drum is preferably provided with laterally spaced peripheral braking surfaces which are separated by a central peripheral groove 11. These braking surfaces are adapted to be frictionally engaged by spaced pairs of brake elements 12, 13 and 14 which are radially arranged about the drum, the elements 12 and 13 being located below the horizontal center line of the drum and at opposite sides thereof and the element 14 being located above the drum centrally thereof. It will here be understood that each brake element may comprise the usual brake shoe and brake shoe head and since this combination of head and shoe is well known by those skilled in the brake art the elements will, for the sake of clearness of description, be hereinafter referred to by either the term brake shoe or brake shoes.

The brake shoes 14 are pivotally carried by a pin 15 slidably mounted in an arcuate slot 16 provided in a combined brake lever and brake carrier 17, which carrier extends longitudinally of the truck on the outer side of the adjacent truck side frame member 7 and which is disposed above the horizontal center line of the drum. The sliding connection between the pin 15 and brake carrier is provided for the purpose of permitting the brake shoes 14 to move relative to the carrier when, as will hereinafter more fully appear, the torque on the shoes, due to braking, is of a certain magnitude.

In the present embodiment of the invention the brake carrier 17 is shown provided at its outer end with a substantially circular horizontally disposed portion 19 which is loosely mounted to move vertically within a pocket 20 carried by the adjacent end piece 9 of the truck frame and which is resiliently supported through the medium of a spring seat 21 and a release spring 22 and which rests on the bottom wall 23 of the recess.

Extending vertically through suitable openings in the portion 19 of the brake carrier, the spring seat 21 and bottom wall 23 of the pocket, is a bolt 24 having at one end a head 25 and at the other end a screw-threaded portion on which there is mounted an adjusting nut 26. This nut engages the outer surface of the bottom wall 23 and is locked in any preferred adjusted position by a check nut 27 having screw-threaded connection with the bolt. The underside of the head 25 engages the upper surface of the spring 21 and thereby, since the nut 26 is in engagement with the wall 23, limits upward movement of the seat by the spring.

The upper end of the pocket 20 is closed by a cover plate 28, and interposed between this place and the upper surface of portion 19 is a spring 29 which serves to yieldably resist upward movement of the brake carrier 17 when, due to service shocks, such movement tends to occur.

The inner end portion of the brake carrier 17 comprises laterally spaced vertically disposed longitudinally extending side pieces 30 which straddle a longitudinally extending brake cylinder 31 rigidly secured to a laterally extending supporting bracket 32 which is preferably formed integral with the truck side member 7. These side pieces are rockably mounted on laterally aligned trunnions 33 which, in the present embodiment of the invention, are integral with the casing of the brake cylinder.

Directly above the brake shoes 14, the brake carrier 17 is provided with a pair of upwardly extending laterally spaced supporting struts 34 which, at their upper ends, have formed integral therewith an annular combined clamping flange and follower guide 35. Supported on and rigidly secured to this flange 35 is a control valve device 36, and clamped between the flange and the casing of the valve device is a flexible diaphragm 37.

At one side of the diaphragm is a follower 38 which is slidably guided in the central bore of the flange 35 for vertical movement either upwardly or downwardly relative to the flange and brake carrier. At the other side of the diaphragm there is a chamber 39 containing a spring 40 which cooperates with the diaphragm and casing of the control valve device to urge the diaphragm into contact with the follower 38.

The chamber 39 is connected through a passage 41 and a flexible conduit 42 to the piston chamber 43 of the brake cylinder 31 and thereby to a conduit 44 through which fluid under pressure is supplied to and released from the brake cylinder to effect the application and release of the brakes, the flow of fluid through the conduit 44 being controlled by the operation of a brake valve device which may be identical with the one shown in the aforementioned pending application. This chamber 39 is in communication with a passage 45 leading to a chamber 46 containing a control valve 47 which is normally maintained seated by a spring 48 to close communication through the passage 45.

Located at each side of the brake carrier 17 are short levers 50 and 51 which are arranged one on each side of the vertical center line of the brake drum 10 and which are rockably connected to the carrier by means of transversely extending pins 52 which are spaced at equal distance from said center line.

These levers 50 and 51 extend upwardly and diverge outwardly from each other and their lower ends are in operative engagement with opposite ends of the brake elements 14 while their upper ends are in operative engagement with levers 53 and 54, respectively, which extend longitudinally of the brake carrier toward each other, and which are pivotally connected at their outer ends by means of pins 55 and 56, respectively, to lugs which are integral with the carrier and which extend upwardly with the upper surface thereof. The inner end portions of the levers 53 and 54 extend between the spaced supporting struts 34 and overlap each other and are pivotally connected together by means of a transversely extending pin 57 which is located directly above the axis of the brake drum, there being a roller 58 interposed between the end portions, which roller is rotatably mounted on the pin. This roller is adapted to operatively engage a central downwardly extending lug 59 of the follower 38.

It is to be noted that the pivot pin 55 for the outer end of the lever 53 is located closer to the pivot pin 57 for the inner ends of both levers 53 and 54 than is the pivot pin 56 for the outer end of the lever 54, and that since the levers 50 and 51 are spaced an equal distance from the vertical center line of the brake drum, the lever 53 will require a greater actuating force to rock it than that required to rock the lever 54. The purpose of this, as will hereinafter more fully appear, is to render the brake control means responsive, while braking, to a greater torque while the wheel and axle assembly is rotating in one direction than when rotating in the opposite direction.

The brake cylinder 31 may comprise the usual piston 60 having a hollow piston rod 61 which extends through a central opening in the head 62 of the brake cylinder. At one side of the piston there is the chamber 43 which, as hereinbefore described, is connected through the passage 41 and flexible conduit 42 to the chamber 39 of the control valve device. At the other side of the piston there is a pressure chamber 63 which is constantly connected through a flexible conduit 64 to the control valve chamber 46 of the control valve device, and which is adapted to be connected to the atmosphere through a passage 65 in the piston, past a normally unseated ball shaped valve 66, the interior of the piston rod and ports 67 in the rod. The ball valve forms the inner end of a push rod 68 contained in the piston rod. Beyond the end of the piston rod the outer end of the push rod is operatively connected to the upper end portion of a vertically disposed brake cylinder lever 69 which is operatively connected intermediate its ends to the brake shoes 12 and which is supported from the brake carrier 17 by means of hangers 70.

Interposed between and operatively engaging the outer end of the piston rod and adjacent shoulder 71 formed on the push rod is a spring 72 which, as shown, is adapted to normally maintain the ball valve in its unseated or release position against a stop pin 73 secured to the hollow piston rod.

The brake cylinder is also provided with the usual release spring 74 which normally maintains the brake cylinder piston in its release position and acts to return the piston to this position when releasing an application of the brakes.

The brake shoes 13 are hung from the brake carrier 17 by means of a hanger lever 75 which lever, at its lower end, is operatively connected to the lower end of the brake cylinder lever by a longitudinally extending connecting rod 76 which is accommodated by the groove 11 in the brake drum. The connection between the connecting rod and brake cylinder lever in the present embodiment of the invention is made through the medium of the slack adjusters 77 carried by the connecting rod.

This slack adjuster may be of any conventional type having a movable cross head 78 which is operatively connected to the lower end of the brake cylinder lever 69 and which may be actuated by a screw mechanism 79 adapted to be manually operated through the medium of an adjusting nut 80.

With the brake cylinder 31 devoid of fluid under pressure the brake rigging will be in release position as shown in the drawing and will be maintained in this position by the force of gravity or by a release spring when such a spring is employed. In this position the dead weight of the brake rigging which is transmitted to the brake carrier 17 will be carried by the spring 22 and brake cylinder trunnions 33.

*Application of the brakes*

When it is desired to effect an application of the brakes, fluid under pressure is admitted to the brake cylinder piston chamber 43 by way of conduit 44 and from this conduit flows through conduit 42 and passage 41 to the diaphragm chamber 39 of the control valve device 35.

In response to the pressure of fluid thus admitted to the brake cylinder piston chamber 43, the brake cylinder piston 60 moves forwardly, first engaging the ball valve 66 and thereby cutting off the atmospheric communication from the brake cylinder chamber 63, and actuating the push rod 68 and thereby the upper end of the brake cylinder lever 69 forwardly so as to move the brake shoes 12 into braking engagement with the brake drum 10. The brake cylinder lever as it is thus actuated acts through the medium of the slack adjuster 77 and connecting rod 76 to actuate the hanger lever 75 to move the brake shoes 13 into braking engagement with the brake drum.

Fluid under pressure supplied to the diaphragm chamber acts through the medium of the diaphragm 37, follower 38, roller 58 and pin 57 to exert a downwardly directed force on the inner overlapping ends of the levers 53 and 54. Force thus transmitted to the levers will not cause them to move downwardly for the reason that they will be effectively locked against such movement by the levers 50 and 51 which abut the opposite ends of the brake shoes 14 in such a manner that they are at this time locked against movement, however, such force does load the inner ends of the levers 53 and 54 in proportion to the pressure of fluid which the operator chooses to admit to the brake cylinder chamber.

With the brake shoes 12 and 13 in engagement with the brake drum 10, the increasing force being applied to the brake shoes through the operation of the brake cylinder piston causes the shoes to move downwardly along the peripheral surface of the drum. This downward movement is due to the location of the shoes below the horizontal center line of the brake drum and the application of the braking force to the shoes in a direction substantially parallel to the horizontal center line of the drum. The downwardly directed forces, due to such action being transmitted through the brake cylinder lever 69, hangers 70 and hanger levers 75 to the brake carrier 17, causing the carrier to move downwardly about the trunnion 33 and against the opposing action of the spring 22 until such time as the brake elements 14 engage the drum. At this time downward movement of the brake carrier 17 and brake rigging will stop since the carrier will now be supported by both the spring 22 and trunnion 33. With the wheel and axle assembly rotating in the direction indicated by the arrow in Fig. 2, the drag of the brake drum 10 on the brake shoes 13 at the front end of the truck will cause a further downwardly directed force to be applied to the hanger levers 73 and thereby to the outer end of the brake carrier 17, thus augmenting the force with which the brake shoes 14 are pressed against the exterior braking surface of the brake drum. The drag of the brake drum on the brake shoes 12 at this end of the truck has a tendency to move these shoes upwardly but this tendency is overbalanced by the downward force set up by the shoes as they tend to move downwardly along the braking surfaces of the drum under the influence of the force of the brake cylinder applied to the upper end of the brake cylinder or live lever 69. In other words the force applied to the outer end of the carrier 17 through the medium of the hanger levers 75 is the sum of the downwardly directed force produced by the action of the shoes 13 under the influence of brake cylinder force and the force produced by the downward drag of the brake drum on the shoes, while the force applied to the carrier 17 through the medium of the hangers 70 is that produced by the brake shoes 12 under the influence of the brake cylinder force minus the force due to the upward drag of the brake drum on the shoes 12. From this it will be apparent that the downward pull of the brake shoes 13 at the leading side of the brake drum will exceed the downward pull of the brake shoes 12 at the other side of the drum. At the other or rear end of the truck the downward pull of the brake shoes 12 and 13 on the carrier 17 is just reverse of that of the shoes at the front end of the truck since the disposition of the shoes 12 and 13 with respect to the leading and other side of the brake drum is the reverse of that at the front end.

It will here be noted that at the front end of the truck the greater pull of the brake shoes at the leading side of the brake drum is transmitted to the outer end of the carrier 17 while at the rear end of the truck the corresponding pull of the brake shoes at the leading side is applied to the carrier 17 intermediate its ends. As a result of this the brake shoes 14 at the front end of the truck will be applied with greater force to the brake drum than will the corresponding brake shoes at the rear end of the truck.

It will be evident that with the brakes applied the brake carrier 17 will tend to rotate with the wheel and axle assembly, so that the carrier at the front end of the truck will exert an upwardly directed force on its trunnions 33, and the carrier at the rear end of the truck will exert a lesser downwardly directed force on its trunnions 33.

Now when the torque on the brake drum and thereby on the brake shoes 14 becomes slightly greater than the opposing force exerted by the diaphragm 37 of the control valve device 35 acting through the medium of the follower 38, roller 58, pin 57, lever 53, and levers 50, on the brake shoes, these shoes will move relative to the brake carrier 17 in the same direction as the brake drum is moving. As the brake shoes are thus moved they rock the lever 50 in a clockwise direction about their pivot pin 52, which levers acting on the lever 53 causes this latter lever to rock in a counterclockwise direction about its pivot pin 55. As the lever 53 is thus actuated, the inner end thereof, acting through the medium of the pin 57 and roller 58, moves the follower 38 and flexible diaphragm 37 upwardly so as to unseat the valve 47.

With the valve 47 unseated fluid under pressure flows from the brake cylinder chamber 43 and diaphragm chamber 39 past the open valve 47 and through valve chamber 46 and conduit 64 to the chamber 63 of the brake cylinder. This flow of fluid from chambers 43 and 39 of course effects a reduction in the pressures in these chambers and the flow of fluid to the chamber 63 increases the pressure therein, all of which serves to reduce the effective force of the brake cylinder piston on the brake cylinder lever 69 and consequently on the associated hanger lever 75 and brake shoes 12, 13 and 14.

If, when the effective force of the brake cylinders has been thus reduced, the torque transmitted to the brake shoes 14 is no longer great enough to preponderate over the opposing downwardly directed force of the diaphragm 37, acting under the influence of the pressure of fluid in chamber 39, the diaphragm flexes downwardly and actuates the levers 53 and 50 so as to return the brake shoes 14 to their centralized position with respect to the arcuate slot 16 in the brake carrier 17. As the diaphragm flexes, the spring 18 acts to seat the valve 47, thus cutting off the flow of fluid from the brake cylinder chamber 43 and diaphragm chamber 39 to the brake cylinder chamber 63.

Now, if, due to the reduction in the rotative speed of the wheel and axle assembly, the torque on the brake shoes 14 again become great enough to overcome the downwardly directed force of the diaphragm 37, the valve 47 will be again unseated in the same manner as before described to permit fluid under pressure to flow from the chambers 43 and 39 to the brake cylinder chambers 63, thus further reducing the force of the brake cylinder on the brake cylinder lever 69 and associated parts of the brake mechanism.

When the wheel and axle assembly is rotating in the direction opposite to that indicated by the arrow in Fig. 2, as would be the case if the assembly shown were at the rear or trailing end of the truck, the torque on the brake shoes 14 will of course be less than when the assembly is rotating in the direction indicated by the arrow since, as hereinbefore described, the shoes on the trailing assembly will be pressed against the drum with less force than the shoes for the leading assembly.

With the assembly rotating in the direction opposite to that indicated by the arrow the brake shoes 14 actuate the lever 51 to move the lever 54 upwardly about its pivot pin 56 to unseat the valve 47. Fluid under pressure now flows from the brake cylinder chamber 43 and diaphragm chamber 39 past the open valve 47 and to chamber 46 and conduit 64 to the brake cylinder chamber 63 thus reducing the effective force of the brake cylinder on the brake cylinder lever 69 in the same manner as when the valve is operated through the medium of the lever 53.

It will here be understood that the valve 47 is operated in substantially the same manner to control the effective force of the brake cylinder regardless of the direction of rotation of the assembly, although the lever 54 will respond to a torque of lesser magnitude than the lever 53 since the lever 54 is of greater length than the lever 53.

When the vehicle is in motion and an application of the brakes is initiated, the momentum of the body of the vehicle has a tendency to tilt the truck forwardly with the result that the adhesion between the rear truck wheels and the track rail will be unintentionally reduced, so that these wheels will have a greater tendency to slide on the rails than will the front truck wheels.

With this in mind the brake mechanism disclosed in the drawings has been so designed that the total braking force of the three pairs of brake shoes on the rear wheels of the truck, for a chosen brake cylinder pressure, will be less than that of the corresponding brake shoes on the front wheel, thereby lessening the tendency of the rear wheels to slide on the track rails. In this connection it will be understood that the mechanism employed for controlling the effective force of the brake cylinder in accordance with control pipe or brake cylinder pressure and the torque on the brake shoes 14 will, at all times, provide the proper braking force for the brake shoes of each wheel and axle assembly.

Release of the brakes

When it is desired to release the brakes, fluid under pressure is vented from the brake cylinder chamber 43, which venting, in the present embodiment of the invention, is accomplished through the conduit 44 and which may be controlled by means of a brake valve device such as shown in the aforementioned application.

As the chamber 43 is thus vented, the force of the brake cylinder release spring 14 and the pressure of fluid trapped in the brake cylinder chamber 63 causes the brake cylinder piston 60 and piston rod 61 to move inwardly to their normal release position, and as the piston thus moves, the force of gravity causes the brake shoes 12 and 13 and the several parts of the brake mechanism associated therewith to assume their normal release position as shown in Fig. 2. As the brake shoes 12 and 13 move out of contact with the brake drum 10, the compressed spring 22 acts to raise the outer end of brake carrier 17, thereby moving the brake shoes 14 out of engagement with the drum, the upward movement of the carrier being limited by the engagement of the spring seat 21 with the underside of the head 25 of the bolt 24.

As the brake cylinder piston is nearing its normal release position the spring 72 acts to stop the further release movement of the brake cylinder push rod 68, so that upon the final release movement of the piston, the valve seat carried by the piston is moved out of engagement with the ball valve 66 forming the inner end of the push rod, thus establishing communication between the passage 65 and thereby the chamber 63 to the interior of the hollow piston rod 61, and since the interior of the piston rod is connected through the port 65 with the atmosphere, fluid under pressure in chamber 63 is exhausted to the atmosphere.

Modifications in the structure illustrated and described may be made without departing from the spirit of the scope of my invention, and I do not therefore wish to be limited otherwise than by the scope of the appended claims.

Having now described my invention, what I claim as new and desire to secure by Letters Patent, is:

1. In a brake mechanism for a railway vehicle truck, in combination, a braking surface carried by and rotatable with a wheel and axle assembly of the truck, clasp arranged brake elements movable into braking engagement in said braking surface, means for actuating said brake elements, another brake element movable into engagement with said braking surface by the clasp arranged brake elements when the clasp arranged brake elements are moved into engagement with the braking surface, said other brake element being movable relative to said clasp arranged elements in response to the torque transmitted thereto from the assembly while braking, and means actuated by said other brake element when it is thus moved for controlling the force applied to said means.

2. In a brake mechanism for a railway vehicle truck, in combination, a braking surface carried by and rotatable with a wheel and axle assembly of the truck, clasp arranged brake elements movable into braking engagement with said braking surface, means for actuating said brake elements, and another brake element movable into engagement with said braking surface by the clasp arranged brake elements when the clasp arranged brake elements are moved into engagement with the brake surface, said other brake element being movable relative to said clasp arranged brake elements in response to the torque transmitted thereto from the assembly, in braking, when the magnitude of the torque on the element exceeds an opposing force which is proportional to any chosen force applied to said means.

3. A brake mechanism for a railway vehicle truck, in combination, a braking surface carried by a rotatable wheel and axle assembly of the truck, clasp arranged brake elements movable into braking engagement with said braking surface, means for actuating said brake elements, another brake element movable into engagement with said braking surface by the clasp arranged brake elements when the clasp arranged brake elements are movable into engagement with the braking surface, and means controlled in response to the relation of the torque on said other brake element and a torque opposing force which is proportional to the force applied to said means, for controlling the force applied to said means.

4. In a brake mechanism for a railway vehicle truck, in combination, a braking surface carried by and rotatable with a wheel and axle assembly of the truck, clasp arranged brake elements movable into braking engagement with said braking surface, means for actuating said brake elements, another brake element movable into engagement with said braking surface by the clasp arranged brake elements when the clasp arranged elements are moved into engagement with the braking surface, and means subject to the torque on said other brake element and an opposing force and operable in response to an increase in the torque on said other brake element over that of the opposing force for controlling the force applied to said means.

5. In a brake mechanism for a railway vehicle truck, in combination, a braking surface carried by and rotatable with the wheel and axle assembly of the truck, clasp arranged brake elements movable into braking engagement with said braking surface, means for actuating said brake elements, another brake element movable into engagement with said braking surface by the clasp arranged brake elements when the clasp arranged brake elements are moved into engagement with the braking surface, and means subject to the torque on said other brake element and an opposing force and operable in response to an increase in the torque on said other brake element over that of the opposing force for decreasing the effect of the actuating force applied to said means.

6. In a brake mechanism for a railway vehicle truck, in combination, a braking surface carried by and rotatable with a wheel and axle assembly of the truck, clasp arranged brake elements movable in the braking engagement with said braking surface, means for actuating said brake elements, another brake element movable into engagement with said braking surface by the clasp arranged brake elements when the clasp arranged brake elements are moved into engagement with the braking surface, and means subject to the torque on said other brake element and an opposing force which is variable according to different chosen degrees of braking and operable when the torque on said other brake element exceeds said opposing force for decreasing the effect of the actuating force applied to said means.

7. In a brake mechanism for a railway vehicle truck, in combination, a braking surface carried by and rotatable with a wheel and axle assembly of the truck, clasp arranged brake elements movable into braking engagement with said braking surface, a brake cylinder adapted to be operated by fluid under pressure for actuating said clasp arranged brake elements, means for admitting fluid under pressure to the brake cylinder, another brake element movable into engagement with said braking surface by the clasp arranged brake elements when the clasp arranged brake elements are moved into engagement with the braking surface, means subject to the torque on said other brake element and an opposing force created by a fluid pressure equal to brake cylinder pressure and operable in response to an increase in the torque on said other brake element over that of the opposing force for reducing the brake applying force of the brake cylinder.

8. In a brake mechanism for a railway vehicle truck, in combination, a braking surface rotatable by a wheel and axle assembly of the truck, clasp arranged brake elements movable into frictional braking engagement with said braking surface, means for actuating said brake elements, another brake element movable into frictional engagement with said surface by said clasp arranged brake elements when the clasp arranged brake elements are caused to frictionally engage said braking surface, said other brake element being movable relative to said clasp arranged brake elements in response to torque of the wheel and axle assembly, and means operative by said other brake element when it moves relative to the clasp arranged brake elements for controlling the force exerted by said means.

9. In a brake mechanism for a railway vehicle truck, in combination, a braking surface rotatable by a wheel and axle assembly of the truck, a brake carrier mounted on the frame of the truck from movement vertically relative thereto, a friction element movable into engagement with said surface by said brake carrier, clasp arranged brake elements carried by said brake carrier and movable into frictional braking engagement with said surface, means operative for actuating said clasp arranged brake elements, said clasp arranged brake elements when in frictional braking engagement with said surface being adapted to actuate said brake carrier to move said friction element into engagement with the surface, control means operative for decreasing the effective actuating force of said means, said friction element being movable relative to said brake carrier in response to the torque of the wheel and axle assembly for actuating said control means.

10. In a brake mechanism for a railway vehicle truck, in combination, a braking surface rotatable by a wheel and axle assembly of the truck, a brake carrier mounted on the frame of the truck for movement vertically relative thereto, a friction element movable into engagement with said surface by said brake carrier, clasp arranged brake elements carried by said brake carrier and movable into frictional braking engagement with said surface, means operative for actuating said clasp arranged brake elements, said clasp arranged brake elements when in frictional braking engagement with said surface being adapted to actuate said brake carrier to move said friction element into engagement with the surface, control means operative for decreasing the effective actuating force of said means, said friction element being movable relative to said brake carrier in response to the torque of the wheel and axle assembly for actuating said control means, and means subject to fluid at brake cylinder pressure for opposing the movement of said friction element.

11. In a brake mechanism for a railway vehicle truck, in combination, a braking surface rotatable by a wheel and axle assembly of the truck, a brake carrier mounted on the frame of the truck for movement vertically relative thereto, a friction element movable into engagement with said surface by said brake carrier, clasp arranged brake elements carried by said brake carrier and movable into frictional braking engagement with said surface, means operative for actuating said clasp arranged brake elements, said clasp arranged brake elements when in frictional braking engagement with said surface being adapted to actuate said brake carrier to move said friction element into frictional engagement with the surface, and control apparatus carried by said brake carrier and operative for controlling the actuating force of said means, said friction elements being movable relative to said brake carrier in response to the torque of said assembly for actuating said control apparatus.

12. In a brake mechanism for a railway vehicle truck, in combination, a braking surface rotatable by a wheel and axle assembly of the truck, a brake element operative into braking engagement with said surface, means for actuating said element, control apparatus operative to control the effective actuating force of said means, and a friction element movable into engagement with said surface by said brake element when the brake element is moved into braking engagement with said surface, said friction element when in engagement with said surface being movable relative to said brake element in response to torque of the assembly for actuating said control apparatus.

13. In a brake mechanism for a railway vehicle truck, in combination, a braking surface rotatable by a wheel and axle assembly of the truck, a brake element operative into braking engagement with said surface, means for actuating said element, control apparatus operative to control the effective actuating force of said means, a friction element movable into engagement with said surface by said brake element when the brake element is moved into braking engagement with said surface, said friction element when in engagement with said surface being movable relative to said brake element in response to torque of the assembly for actuating said control apparatus, and means for opposing the operation of the control apparatus by a force which varies with variations in the actuating force for said means.

14. In a brake mechanism for a railway vehicle truck, in combination, a braking surface rotatable by a wheel and axle assembly of the truck, a brake element movable into braking engagement with said surface, means for actuating said element, control apparatus operative to control the force with which said brake element is pressed into engagement with said surface, and a friction element movable into engagement with said surface by said brake element when the brake element is moved into braking engagement with said surface, said friction element when in engagement with said surface being movable relative to said brake element in response to torque of the assembly for actuating said control apparatus.

15. In a brake mechanism for a railway vehicle truck, in combination, a braking surface rotatable by a wheel and axle assembly of the truck, a brake element movable into braking engagement with said surface, means for actuating said element, control apparatus operative to control the force with which said brake element is pressed into braking engagement with said surface, a friction element movable into engagement with said surface by said brake element when the brake element is moved into braking engagement with said surface, said friction element when in engagement with said surface being movable relative to said brake element in response to torque of the assembly for actuating said control apparatus, and means for opposing the operation of said control apparatus which varies with variations in the actuating force for said means.

16. In a brake mechanism for a railway vehicle truck, in combination, a braking surface rotatable by a wheel and axle assembly of the truck, a brake element operative into braking engagement with said surface, fluid pressure actuated means for actuating said element, control apparatus operative to control the pressure of fluid acting on said means, and thereby the effective actuating force of the means, a carrier for said brake element, and a friction element slidably mounted on said carrier and movable thereby into engagement with said surface in response to the force exerted thereon by said brake element when the brake element is moved into braking engagement with said surface, said friction element when in engagement with said surface being slidable relative to the carrier in response to torque of the assembly, for actuating said control apparatus.

17. In a brake mechanism for a railway vehicle truck, in combination, a braking surface rotatable by a wheel and axle assembly of the truck, a brake element movable into braking engagement with said surface, means for actuating said element, control apparatus operative to control the pressure of fluid in said means and thereby the effective actuating force of the means, a friction element movable into engagement with said surface by said brake element when the brake element is moved into braking engagement with said surface, said friction element when in engagement with said surface, being movable relative to said brake element in response to torque of the assembly for actuating said control apparatus, and means subject to the pressure of fluid in said means for opposing the operation of the control apparatus until the torque on the friction element exceeds the opposing force.

18. In a brake mechanism for a railway vehicle truck having a truck frame and a truck frame supporting wheel and axle assembly and a braking surface carried by and rotatable with the assembly, in combination, a brake element movable into braking engagement with said surface, a member carried by said truck frame and movable vertically relative thereto, said member carrying said brake element, means for actuating said brake element, said brake element when in braking engagement with said surface being adapted to actuate said member, a friction element movable with said member into engagement with said surface and movable when in such engagement relative to the member in response to the torque of said wheel and axle assembly, and means operative by said friction element when it responds to torque for decreasing the effective force of the first mentioned means.

19. In a brake mechanism for a railway vehicle truck having a truck frame, a truck frame supporting wheel and axle assembly and a braking surface carried by and rotatable with the assembly, in combination, a brake element movable into braking engagement with said surface, means carried by said truck frame and operable for actuating said brake element, a member rockably mounted on said means for movement vertically relative to said truck frame, said member carrying said brake element, and being operable by said brake element when the brake element is in braking engagement with said surface, a friction element carried by and movable with said member into engagement with said surface and movable when in such engagement relative to the member in response to the torque of said wheel and axle assembly, and means carried by said member operative by said friction element when it responds to torque for decreasing the effective force of the first mentioned means.

20. In a brake mechanism for a railway vehicle truck having a truck frame and a truck frame supporting wheel and axle assembly and a braking surface carried by and rotatable with the assembly, in combination, a brake element movable into braking engagement with said surface, a member carried by said truck frame and movable vertically relative thereto, said member carrying said brake element, means for actuating said brake element, said brake element when in braking engagement with said surface being adapted to actuate said member, a friction element movable with said member into engagement with said surface and movable when in such engagement relative to the member in response to the torque of said wheel and axle assembly, and means operative by said friction element when it responds to torque for decreasing the effective force of the first mentioned means, the second mentioned means comprising a control element, a lever for actuating said control element, and a lever actuated by said friction element for actuating the first mentioned lever.

21. In a brake mechanism for a railway vehicle truck having a truck frame, a truck frame supporting wheel and axle assembly and a braking surface carried by and rotatable with the assembly, in combination, a brake element movable into braking engagement with said surface, a member carried by said truck frame and movable vertically relative thereto, said member carrying said brake element, means for actuating said brake element, said brake element when in braking engagement with said surface being adapted to actuate said member, a friction element movable with said member into engagement with said surface and movable, when in such engagement, relative to the member in response to the torque of said wheel and axle assembly, means operative by said friction element when it responds to torque for decreasing the effective force of the first mentioned means, and means subject to the actuating force of the first mentioned means for opposing movement of said friction element.

22. In a brake mechanism for a railway vehicle truck having a truck frame supporting wheel and axle assembly and a braking surface carried by and rotatable with the assembly, in combination, a brake element movable into braking engagement with said surface, a member carried by said truck frame and movable vertically relative thereto, said member carrying said brake element, fluid pressure responsive means for actuating said brake element, said brake element when in braking engagement with said surface being adapted to actuate said member, a friction element movable with said member into engagement with said surface and movable when in such engagement relative to the member in response to the torque of said wheel and axle assembly and means operative by said friction element when it responds to torque for decreasing the effective force of the first mentioned means, and means subject to the fluid at brake cylinder pressure for opposing movement of said friction element relative to said member.

23. In a brake mechanism for a railway vehicle truck wheel and axle assembly, in combination, mechanism operative for braking said assembly, said mechanism being so constructed and arranged with relation to the assembly as to provide, for any given actuating force, heavier braking of the assembly when the assembly is rotating in one direction than when rotating in the opposite direction, a control element movable for decreasing the braking force of the mechanism on the assembly, and means responsive to the torque on the mechanism in braking with the wheel and axle assembly rotating in either direction for actuating said control element, said means being so constructed and arranged with relation to the mechanism as to be less sensitive to torque on the mechanism when the assembly is rotating in said one direction than when the assembly is rotating in the opposite direction.

24. In a brake mechanism for a railway vehicle truck wheel and axle assembly, in combination, mechanism operative for braking said assembly, said mechanism being so constructed and arranged with relation to the assembly as to provide, for any given actuating force, heavier braking of the assembly when the assembly is rotating in one direction than when rotating in the opposite direction, a control element movable for decreasing the braking force of the mechanism on the assembly, a lever responsive to the torque on the mechanism when braking with the wheel and axle rotating in said one direction for actuating said control element, and a lever of greater length than the first mentioned lever responsive to the torque on the mechanism when braking with the wheel and axle assembly rotating in said opposite direction.

25. In a brake mechanism for a railway vehicle truck wheel and axle assembly, in combination, mechanism operative for braking said assembly, fluid pressure responsive means for actuating said mechanism, said mechanism being so constructed and arranged with relation to said assembly as to provide, for any given fluid pressure acting on said fluid pressure responsive means, heavier braking of the assembly when the assembly is rotating in one direction than when the assembly is rotating in the opposite direction, a single valve operative to so control the fluid pressure acting on said fluid pressure responsive means as to decrease the actuating force of the means, means responsive to the torque on the mechanism in braking with said assembly rotating in said one direction for actuating said valve, and means responsive to the torque on the mechanism in braking with said assembly rotating in said opposite direction for actuating said valve, the second mentioned means being more sensitive to torque than the first mentioned means.

CARLTON D. STEWART.